Nov. 4, 1952 — J. GREENHUT — 2,616,682
CENTRIFUGAL SPEED RESPONSIVE DEVICE WITH SPRING SUPPORT
Filed Feb. 1, 1949 — 2 SHEETS—SHEET 1
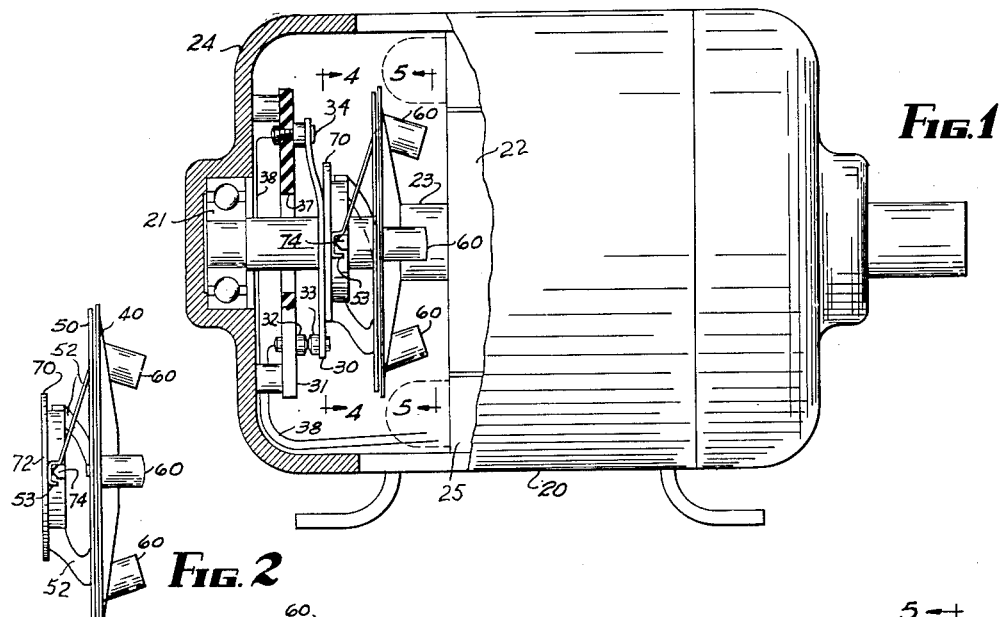
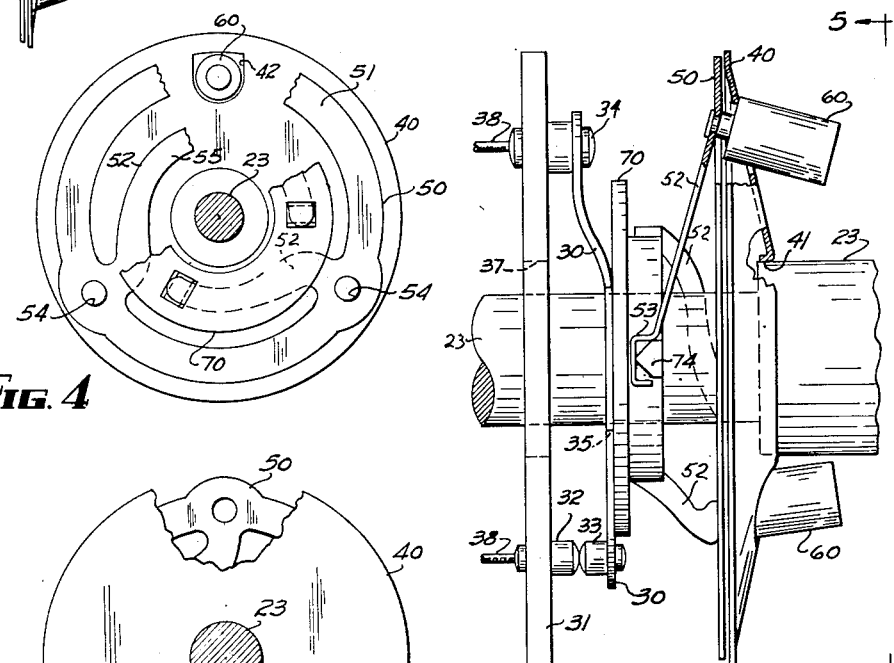
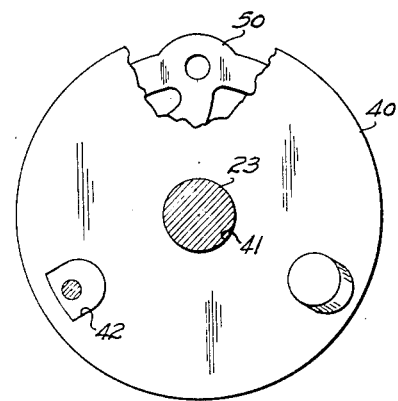
INVENTOR.
JOSEPH GREENHUT Nov. 4, 1952 J. GREENHUT 2,616,682
CENTRIFUGAL SPEED RESPONSIVE DEVICE WITH SPRING SUPPORT
Filed Feb. 1, 1949 2 SHEETS—SHEET 2
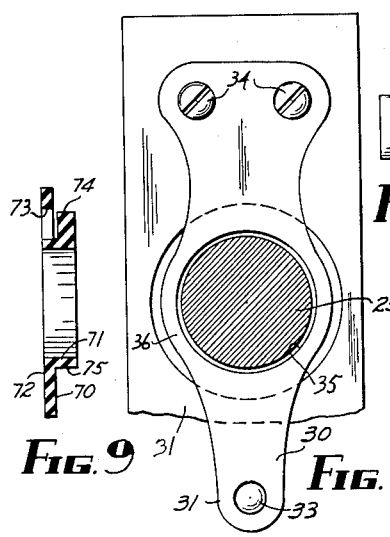
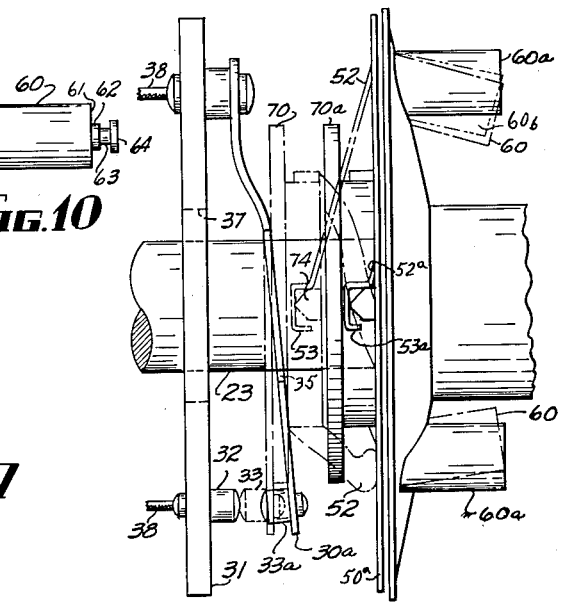
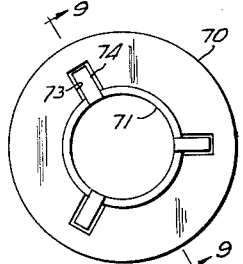
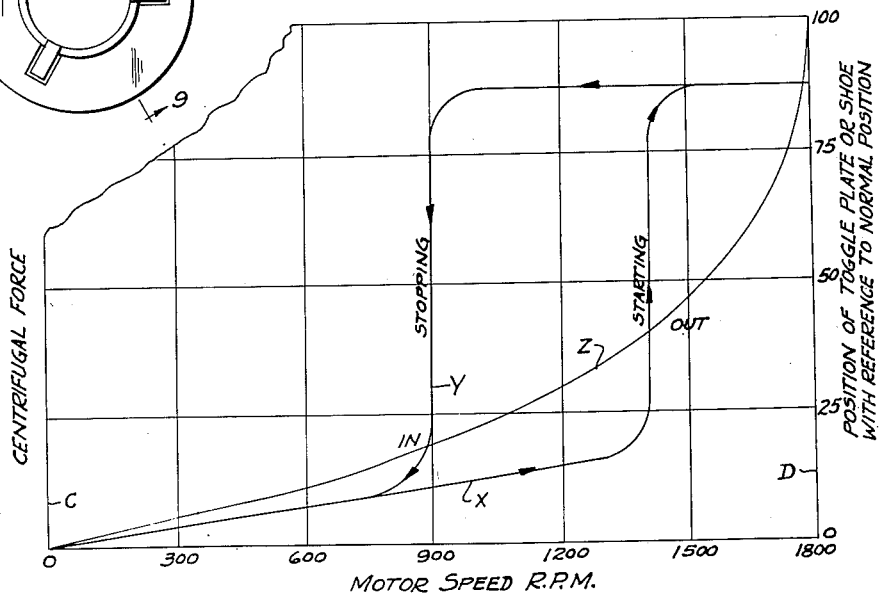
INVENTOR.
JOSEPH GREENHUT

UNITED STATES PATENT OFFICE 2,616,682

CENTRIFUGAL SPEED RESPONSIVE DEVICE WITH SPRING SUPPORT

Joseph Greenhut, University Heights, Ohio

Application February 1, 1949, Serial No. 73,958

8 Claims. (Cl. 264—18)

This invention relates to centrifugal governors and particularly to centrifugally operating starting switches for induction motors.

Conducive to a better understanding of this invention, it may be well to point out that of all the various types of alternating current motors, the induction-type motor is the most popular, whether for use in single-phase or in polyphase circuits. The enormous popularity of the induction motor is due principally to its simple structure, rugged and reliable operation and constant speed characteristics.

The polyphase induction motor is the essence of simplicity and is self-starting.

Taking the twophase motor as an example, we find two component stationary fields which combine to form a single resultant field which rotates. One of these component fields is set up by one phase, and the other component field by the second phase, but both components of the rotating field are set up by separate stator windings.

However, in the single-phase motor, there is only one winding on the stator, and this one winding can set up only one of the two components required to produce a rotating field. Neglecting the effect of the rotor, the magnetic field so set up will be stationary in space but pulsating in magnitude; it will be at a maximum value when the current is maximum and zero when the current is zero—the significant point, however, being that the field is stationary in space and does not revolve, as in the case of the twophase motor.

Since the field set up by the stator winding does not revolve there is no tendency for the rotor to turn; hence there is no inherent locked-rotor torque. However, once the motor is started and running, the single-phase motor will develop torque because of the action of the cross field set up by the rotor. It is, therefore necessary to employ a starting device of some sort for any single-phase induction motor.

A basic requirement of self-starting induction motors is the presence of two separate magnetic fields which are out of phase and which rotate in the space within the fields magnets. These two magnetic fields can be obtained from a single-phase supply by what is known as "splitting the phase." By this, it is meant that two channels are provided for the current obtained from the supply and a phase difference is created between the currents in the two branches.

One of the circuit branches is connected to a main winding in the stator and forms what is known as the "running" field and the other branch is connected to an auxiliary winding in the stator and forms what is known as the "starting" field. One of the two most convenient methods of splitting the phase of the power-supply current is the use of capacity and inductance in one leg of the circuit as against the presence of substantially pure inductance in the other. The other method involves the use of different values of inductance in the "starting" and "running" winding systems.

A motor employing the first method is known as a "capacitor-start" motor while the second type is known as a "split-phase" induction motor.

A "split-phase" induction motor has two separate and distinct windings on the stator: a main or running winding; and an auxiliary or starting winding. Each winding is a complete circuit in itself. Ordinarily the two windings are spaced ninety electrical degrees apart. The rotor is usually of the squirrel-cage construction. For starting purposes, both main and auxiliary windings are connected in parallel across the line. In series with the auxiliary winding is a starting switch which opens at approximately 75 to 80 per cent of synchronous speed. By making the inductance of the starting winding less than that of the running winding, the magnetic field between the pole pieces, and due to the current flow in the starting winding, will be displaced ahead of the magnetic field due to the current in the running windings. The net result is a rotating field, equivalent in its effect to the two-phase system.

At standstill, both windings must be in the circuit to develop torque as explained heretofore. But after the motor has come up to approximately 75 or 80 per cent of synchronous speed, the main winding alone can develop nearly as much torque as the combined windings. At a higher speed, between 80 and 90 per cent of synchronous speed, the motor develops less torque, for any given slip, with the auxiliary winding in the circuit than with it out. Consequently, it is advantageous, purely from a torque standpoint, to cut the auxiliary winding out of circuit exactly at the "cross over" point of the speed-torque curves.

The use of a starting switch is also necessary because its opening prevents the motor from drawing excessive current from the line and burning up the starting winding when operating at normal running speeds, as it would do if the auxiliary winding were left in circuit continuously.

The "capacitor-start" motor has two separate windings similar to that of the "split phase" motor but in addition a capacitor of suitable size is connected in series with the auxiliary winding and starting switch. By making the capacity effect preponderant, the current in the starting winding is caused to lead the current in the running winding. In other words, the basic condition of a phase difference between the two currents which create the magnetic fields at the rotor poles is caused to exist, and conditions resembling those which are obtained with a two-phase supply are again set up.

All of the considerations making necessary a starting switch in the split-phase induction motor apply with equal force to the capacitor-start motor. Furthermore, the capacitor volts increase rapidly above switch-operating speed. Therefore, the switch must be positive in action; it must not flutter. If the switch should happen to interrupt the circuit at such a time as to leave the capacitor fully charged and then close the circuit when the voltage is of opposite polarity, double voltage would be impressed momentarily upon the capacitor. It is therefore of the utmost importance that the starting switch be so constructed that fluttering is impossible.

The primary object of this invention, therefore, is to provide a starting switch for single phase induction motors that is both positive in action and incapable of fluttering when certain electric circuits are either opened or closed.

Another object is to provide a durable device of the type stated that is simple in structure, easy to assemble and economical to manufacture.

These and other objects of the invention will become apparent from a reading of the following specification and claims together with the accompanying drawing wherein:

Figure 1 is a side view of an electric motor with parts thereof broken away to show the improved starting switch mounted therein;

Figure 2 is a side view of the starting switch operating device;

Figure 3 is an enlarged view of the centrifugal switch operating device and switch mounted on the motor and showing the switch in its closed or starting position;

Figure 4 is an elevation of the starting switch operating device and part of the motor in section taken along the line and in the direction of the arrows 4—4 of the Figure 1;

Figure 5 is another elevation of the device taken substantially along the line and in the direction of the arrows 5—5 of the Figures 1 and 3;

Figure 6 is a view similar to that of Figure 3 but showing the switch in its open position;

Figure 7 is a plan view of the switch arm mounted on the motor and around the motor shaft;

Figure 8 is a plan view of the switch operating plate or shoe;

Figure 9 is a side elevation of the switch operating shoe with parts thereof broken away taken substantially along the line and in the direction of the arrows 9—9 of the Figure 8;

Figure 10 is a side view of one of the centrifugal weights used to operate the device; and Figure 11 is a chart showing an example of the motor speeds at which the novel switch may automatically open or close.

A conventional single-phase induction motor 20 of the type having main and auxiliary windings, is shown in the Figure 1.

The motor has the usual components such as a housing 24, a stator 25, bearings 21, a shaft 23, and a squirrel-cage rotor 22. In addition the instant motor embodies a starter switch mechanism made in accordance with this invention.

The switch arm 30 is mounted on a dielectric panel 31 which is bolted to the housing of the motor as shown in the Figure 1. The panel 31 has a hole 37 through which the shaft 23 extends but does not touch. The switch arm 30 is made of a sheet material having good flexing as well as electrical conducting properties, such as phosphor bronze. The switch arm 30, as shown in the Figure 7, is rigidly secured at one end to the dielectric panel 31 by means of the bolts 34, to one of which is attached one of the leads 38 of the auxiliary circuit.

Reference character 35 indicates a shaft-clearing hole through which the shaft 23 runs. The size of this hole is such that it will clear the shaft in all possible positions of the arm 30. A switch point 33 is located on the free end of the switch arm and a fixed switch point 32 is located on the dielectric panel 31 in line with the movable switch point 33. The other lead 38 of the auxiliary circuit is connected to this stationary switch point.

The switch arm is bent and shaped so that it will normally hold the switch point 33 away from the switch point 32 thereby opening the auxiliary circuit. However, it may be easily flexed by pressure brought to bear against the bearing area 36 which surrounds the shaft clearance hole 35. When the arm 30 is flexed the switch point 33 meets the switch point 32 and the auxiliary circuit is connected to the electrical system of the motor in the conventional manner for the purposes aforesaid.

The switch operating mechanism is mounted on the shaft proximate the switch arm and rotates as a unit with the shaft. The operating mechanism consists broadly of the base plate 40, the skeletal toggle plate 50 and the switch shoe 70. The base 40 is circular in shape and concave-convex in cross section as shown in the Figure 3. The base is securely attached to the motor shaft 23 which runs through its central hole 41. In the preferred form of the device three evenly spaced weight engaging rectangular holes 42 are spaced one hundred and twenty degrees apart around the periphery of the base. The holes are curved at their inner edge to conform to the curvature of the hereinafter described weights 60 as is shown most clearly in the Figure 5.

The concave disk referred to and indicated as the toggle plate 50 may be stamped out of a cupped disk of flexible sheet metal and comprises a narrow frusto-conical ring portion 51 having three arcuate L-shaped fingers 52 integral therewith and extending inwardly toward the center of the ring and tangent to the ring, as shown in the Figures 2 and 4. Each finger is bent at the end thereof to form a substantially semi-circular hook 53. The arcuate shape of the fingers permits the fingers to be made long thereby increasing their leverage moment and adding to their resiliency. The portion 55 of each finger is a continuation of the ring 51 and has the same cupped curvature as the ring itself, as shown in the Figure 2. This in effect widens the ring at its points of flexion while at the same time permits the balance of the ring to be narrower, thereby reducing the material of the toggle plate and making it possible to operate the device with relatively smaller and lighter weights 60. A hole or weight retaining means 54 is located in the ring proximate the junction point of each finger with the ring.

Each weight 60 consists of a relatively small piece of metal such as brass or lead. Each weight has an axial stud 62 of reduced diameter which together with the body of the weight forms a shoulder 61. The end of the stud is turned down to form a pin 63 that tightly fits into the toggle plate hole 54. To mount the toggle plate 50 on the base plate 40, a weight 60 is placed in each of the rectangular base holes 42, on the convex side of the base plate, with its shoulder 61 seated on the straight outer edge of the hole 42. The concave side of the toggle plate 50 is seated against the concave side of the base plate 40 and the weight pins 63 are inserted through their respective toggle plate holes 42. The ends of the pins are then peened to form a retaining head 64 which securely locks each weight in place. The manner of mounting the weights on the concave side of the toggle plate causes them to assume a position inclined inward toward the shaft 23, while the convex curvature of the base plate 40 together with the curvature of the inner edge of mounting holes 42 permits the weights to take this position without interference, as shown in the Figures 1, 3, 5 and 6. Such outward movement is limited by the engagement of shoulders 61 of the weights with the surface of base plate 40 adjacent the apertures 42 therein through which the weights extend.

Reference character 70 indicates a circular dielectric shoe having a laterally extending hub 75 and three radially extending slots 73 spaced one hundred and twenty degrees apart around the hub as shown in the Figures 8 and 9. The hub 75 has a central shaft hole 71 which is large enough to clear the shaft 23 as shown in the Figure 4. Three radially extending pegs 74 project outwardly from the hub at each slot. Each peg is aligned with the center of its respective slot 73 and has a V-shaped cross section on the side facing the slots 73 as shown in the Figure 9. The other side 72 of the shoe is flat and is intended to engage the bearing surface 36 of the switch arm 30.

The shoe 70 is mounted on the toggle plate 50 with the motor shaft passing through its central hole 71 and with the finger hooks 53 of the toggle plate 50 engaged with the pegs 74 of the shoe.

The manner of mounting the shoe 70 on the finger hooks 53 by means of the shoe pegs 74 which are engaged by the hooks 53 causes the shoe to float lightly on the fingers. The shoe is therefore able to weave slightly and maintain a firm square contact against the switch arm bearing surface 36 under all operating conditions. This relatively loose floating action also allows for the slight change of inside radius of the fingers during the momentary snap of toggle action.

When the motor is in-operative, the shoe 70 presses against the switch arm 30 causing the switch points 32 and 33 to be in contact. This closes the auxiliary starter circuit which thereupon becomes a part of the motor electrical system. The resilient toggle plate fingers 52 hold the shoe 70 firmly against the switch arm because the cupped disk from which they were formed gives the fingers a convex contour and causes them to stand out or away from the ring portion 51 of the toggle plate 50. At the same time, the fingers 52 are slightly flexed so that any inequality in the pressure of the shoe 70 against the switch arm 30, while the motor is starting, is absorbed by the cushioning effect of the fingers 52.

When the motor is started, the shoe 70 rotates with the shaft but continues to press against the switch arm 30 thereby keeping the starting circuit closed. The weights 60 begin to pivot outwardly under the influence of the centrifugal force developed by their rotation. As the centrifugal force grows the weights exert a twisting or torsional or flattening force on the toggle plate ring 51 and finger base portion 55 since they are mounted around the edge of the ring. The cupped structure of the ring causes it to resist this twisting or flattening action much in the manner that the bottom of an oil can resists depression, whereby the toggle plate ring 51 constantly exerts a positive tension in a direction to restore itself to its normal frusto-conical shape. As the centrifugal force continues to increase with an increase in the rotor speed the torque exerted by the outward movement and pressure of the weights against the toggle ring 51 builds up until a predetermined speed is reached or until approximately seventy-five or eighty percent of synchronous speed is attained, as shown by the example in Figure 11, at which instant the toggle plate suddenly flattens out. The shoe 70 is thereupon suddenly carried longitudinally of the shaft 23 toward the base plate 40 and away from the switch arm 30, by the toggle fingers 52. The switch arm 30 which carries the switch point 33 immediately springs away from the switch point 32 thereby breaking the auxiliary starting circuit, which is no longer needed since the motor will continue to run on the current of the main electric circuit, once it is started.

Reference characters 60a, 50a, 70a and 30a indicate the alternate or flexed condition of the weights, toggle plate, shoe and switch arm respectively.

The significance of this snap action can be more easily understood by referring to the graph of Figure 11 wherein the abscissa is divided into units representing revolutions per minute of the motor shaft. The ordinate D indicates the amount of deflection of the toggle plate while the ordinate C indicates centrifugal force.

The line Z of the graph represents the centrifugal force developed by the rotating weights 60 which is seen to be proportional to the square of the motor speed.

The toggle plate 50 is normally cupped with its fingers 52 extending away from the ring portion 41. This will hereinafter be designated as the "out" position of the toggle plate. When a critical flexing pressure is brought to bear on the edge of the toggle plate it will suddenly snap into a flattened or opposite condition wherein the fingers 32 lie in approximately the same plane as the ring portion 51. This will hereinafter be designated as the "in" position of the toggle plate.

Referring to the graph, the curve X represents the condition of the toggle plate when the motor is accelerating from 0 to 1800 R. P. M., and the curve Y represents the condition of the toggle plate when the motor is de-celerating. It will be seen that the centrifugal force indicated by the curve Z continues to increase with the motor speed but the toggle plate flexes only slightly until the motor speed and its associated centrifugal force reaches a critical point at approximately 1400 R. P. M. when the toggle plate suddenly snaps from its "out" to its "in" condition.

As the motor continues to accelerate to its normal running speed of 1800 R. P. M. the toggle plate is flattened slightly more as the weights move out slightly to take the running position designated by the reference character 60a in the Figure 6. In this condition the shoe 70a is entirely out of contact with the switch arm 30a as seen in the Figure 6 so that there is no drag or friction between the parts, thereby assuring a quiet and free running motor. It should also be noted that as the speed of the motor is increased the radius or arc through which the weights 60 travel is also increased, which in turn, increases the centrifugal force exerted by the weights.

By studying the curve Y with reference to the centrifugal force line Z it will be seen that it takes much more force to snap the toggle plate into its "in" condition than to hold it there. In fact, curve Y indicates that the motor speed and its accompanying centrifugal force can be lowered to approximately 900 R. P. M. before the toggle plate will snap back to its "out" condition. At the snapback point of 900 R. P. M. the weights 60 are passing through the position indicated by the reference character 60b in the Figure 6. The weights continue their travel inward as the motor speed falls permitting the toggle plate to cup slightly more until the motor is stopped. However, once the toggle plate has snapped "out" after passing 900 R. P. M. the switch arm is positively held in its closed position by the tension or torsion of the resilient finger 52.

In other words, there is a spread of about 500 R. P. M. between the speed at which the toggle plate 50 is thrown "in" and "out," which simultaneously causes the starter switch 30 to be thrown "off" or "on."

The snap action of the toggle plate causes the switch arm to be either in its "on" or "off" condition; with instantaneous change from one position to the other. There is no gradual opening of the switch, with accompanying arcing and burning of the switch points as occurs in devices that employ direct operating centrifugal weights. The wide difference between the forces required to throw the toggle plate "in" or "out" makes it impossible for this starter switch to flutter. If the motor speed should fall slightly at the moment the auxiliary circuit is broken the switch will not be thrown "on" because the motor speed would have to decrease 500 R. P. M. before this could happen, in the example given.

The heart of this invention is the spring toggle or concave ring or plate 51. Its action differs from the action of heretofore used mechanical toggle devices because it has a maximum tension at its critical or snap point, while mechanical toggles have a constant or even an increased tension after passing its toggle or critical point. This governor is practically free of friction and is therefor subjected to design or is capable of adjustment that makes it possible to predetermine almost exact speeds at which its controls operate.

This type of circuit controller is especially suitable for use in capacitor start motors where a fluttering switch would destroy the starting circuit condensor as indicated hereinbefore.

While the centrifugal governor has been shown as a part of the starting circuit of an induction motor it is also adapted to control any type of device that is dependent on the speed of a rotating shaft.

It will now be clear that there is provided by this invention a device which accomplishes the objects heretofore set forth. While the invention has been disclosed in its preferred form, it is to be understood that the specific embodiment thereof as illustrated and described is not to be construed in a limiting sense as there may be other forms or modifications of the invention which could also be considered to come within the scope of the appended claims.

What I claim is:

1. A controller for a switch for an auxiliary circuit in an electric motor and comprising in combination, a base plate attachable to the armature shaft of a motor, a flexible, normally concavo-convex ring loosely connected to said base plate for rotation therewith, a plurality of weights spaced circumferentially around said ring and fixed thereto, said weights projecting from the concave surface of said ring and during the rotation of said shaft being responsive to centrifugal force and upon the attainment of a predetermined speed serving to twist the portions of said ring attached to said weights toward a flattened condition, a plurality of fingers carried by said ring and extending inward toward the center of said ring and movable by said ring when twisted, and a switch operating member connected to the free ends of said fingers and movable thereby axially of said armature shaft when said fingers are moved as aforesaid, said ring constantly exerting a positive tension tending to resore said ring and fingers to the normal position thereof.

2. A controller for a switch for an auxiliary circuit in an electric motor and comprising in combination, a base plate attachable to the armature shaft of a motor, a flexible skeletal normally concavo-convex toggle member comprising a ring loosely connected to said base plate for rotation therewith and a plurality of fingers integral with said ring and extending inward toward the center thereof, a plurality of weights spaced circumferentially around said ring and fixed thereto, said weights projecting from the concave surface of said ring and during the rotation of said shaft being responsive to centrifugal force and upon the attainment of a predetermined speed serving to twist the portions of said ring attached to said weights toward a relatively flattened condition and thereby simultaneously move said fingers, and a switch operating member connected to the free ends of said fingers and supported thereby for quick movement in one direction axially of said armature shaft by said arms when said ring is twisted as aforesaid, said ring constantly exerting a positive tension tending to restore said ring and fingers to the normal positions thereof.

3. A controller for a switch for an auxiliary circuit in an electric motor and comprising in combination, a base plate attachable to the armature shaft of a motor, a flexible skeletal normally concavo-convex toggle member comprising a ring loosely connected to said base plate for rotation therewith and a plurality of fingers integral with said ring and extending inward toward the center thereof, a plurality of weights spaced circumferentially around said ring and fixed thereto adjacent the junctures of said fingers therewith, said weights projecting from the concave surface of said ring and during the rotation of said shaft being responsive to centrifugal force and serving to twist the portions of said ring to which said weights are attached toward a relatively flattened condition upon the attainment of a predetermined speed of rotation and thereby simultaneously move said arms from the normal position thereof, a switch operating member adjacent the free ends of said fingers, and means on the ends of said fingers engaging said switch operating member and said arms being operable quickly to move said member axially of said armature shaft when said portions of said ring are twisted as aforesaid.

4. A controller for a switch for an auxiliary circuit in an electric motor and comprising in combination, a base plate attachable to the armature shaft of a motor, a flexible normally concavo-convex ring loosely connected to said base plate for rotation therewith, a plurality of weights spaced circumferentially around said ring and fixed thereto, said weights projecting from the concave surface of said ring and during the rotation of said shaft being responsive to centrifugal force and upon the attainment of a predetermined speed serving to twist the portions of said ring to which said weights are attached from the normal position thereof toward a relatively flattened condition, a plurality of fingers carried by said ring, each finger extending inward from said ring and then curved similarly to said ring, said fingers being movable simultaneously by said ring when twisted as aforesaid, and a switch operating member carried by the free ends of said fingers and quickly movable thereby axially of said armature shaft when said ring is twisted as aforesaid.

5. A controller for a switch for an auxiliary circuit in an electric motor and comprising in combination, a base plate attachable to the armature shaft of a motor, a flexible normally concavo-convex ring loosely connected to said base plate for rotation therewith, a plurality of weights spaced circumferentially around said ring and fixed thereto, said weights projecting from the concave surface of said ring and during the rotation of said shaft being responsive to centrifugal force and upon the attainment of a predetermined speed serving to twist the portions of said ring to which said weights are attached from the normal position thereof toward a relatively flattened condition, a plurality of fingers carried by said ring, each finger extending inward from said ring and then curved similarly to said ring, a hook on the free end of each finger, and a switch operating member connected to said hooks on said fingers, said fingers being simultaneously movable by said ring when twisted as aforesaid and thereby quickly moving said ring axially of said armature shaft.

6. A controller for a switch for an auxiliary circuit in an electric motor and comprising in combination, a base plate attachable to the armature shaft of a motor and having a series of even spaced apertures therethrough, a flexible skeletal normally concavo-convex toggle member comprising a ring loosely connected to said base plate for rotation therewith and a plurality of fingers integral with said ring and extending inward toward the center thereof, a plurality of weights fixed to said ring in circumferentially spaced relationship and provided with shoulders, said weights projecting from the concave surface of said ring through said apertures in said plate and during the rotation of said shaft being responsive to centrifugal force and upon the attainment of a predetermined speed simultaneously moving to twist the portions of said ring to which said weights are attached toward a relatively flattened condition and thereby simultaneously move said fingers, such movement of said weights being limited by engagement of the shoulders thereon with said plate, and a switch operating member connected to the free ends of said fingers and supported thereby for quick movement in one direction axially of said armature shaft by said arms when said ring is twisted as aforesaid.

7. A centrifugally responsive device of the character described comprising a base plate attachable to a rotatable shaft, a flexible circular, normally concavo-convex element loosely connected to said base plate for rotation therewith, a plurality of weights secured in circumferentially-spaced relationship to marginal portions of said element, said weights projecting convergently from the concave surface of said element and exerting a twisting moment upon the marginal portion thereof, said weights being yieldably movable in response to centrifugal force to twist the marginal portion of said element in a direction opposed to its normal concave-convex position whereby the non-marginal portion of said element is displaced axially of said shaft.

8. A device as defined in claim 7 including control-actuating means operatively connected to the non-marginal portion of said element and axially movable therewith.

JOSEPH GREENHUT.

REFERENCES CITED

The following references are of record in the file of this patent:

UNITED STATES PATENTS

| Number | Name | Date |
| --- | --- | --- |
| 2,164,667 | Sinnett | July 4, 1939 |
| 2,256,715 | Kirschner | Sept. 23, 1941 |
| 2,416,973 | Wright | Mar. 4, 1947 |